(12) United States Patent
Kogusuri et al.

(10) Patent No.: US 7,430,363 B2
(45) Date of Patent: Sep. 30, 2008

(54) IMAGE PLAYBACK APPARATUS AND METHOD WITH PLAYBACK FRAME RATE OF SELECTED REPRESENTATIVE IMAGE BEING HIGHER THAN THAT OF OTHER REPRESENTATIVE IMAGES, OR WITH PLAYBACK OF AUDIO DATA OF IMAGE FILE CORRESPONDING TO SELECTED REPRESENTATIVE IMAGE

(75) Inventors: Kouji Kogusuri, Kanagawa (JP); Hiroaki Endo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 10/653,956

(22) Filed: Sep. 4, 2003

(65) Prior Publication Data

US 2004/0042765 A1 Mar. 4, 2004

Related U.S. Application Data

(63) Continuation of application No. 10/600,759, filed on Jun. 23, 2003, now abandoned.

(30) Foreign Application Priority Data

Jun. 27, 2002 (JP) .............................. 2002-188349

(51) Int. Cl.
H04N 5/91 (2006.01)
H04N 5/00 (2006.01)
(52) U.S. Cl. ......................................... 386/96; 386/125
(58) Field of Classification Search ....................... None
See application file for complete search history.

(56) References Cited

U.S. PATENT DOCUMENTS 5,497,194 A * 3/1996 Sakagami et al. ............. 386/96
5,583,791 A * 12/1996 Harigaya et al. ............. 348/575

(Continued)

FOREIGN PATENT DOCUMENTS

JP 07-182366 7/1995

(Continued)

OTHER PUBLICATIONS

Oct. 19, 2007 Japanese Official Action in Japanese Patent Application No. 2002-188349 with English translation.

*Primary Examiner*—John W. Miller
*Assistant Examiner*—Heather R Jones
(74) *Attorney, Agent, or Firm*—Fitzpatrick, Cella, Harper & Scinto

(57) ABSTRACT

It is an object of this invention to allow easy recognition of the contents of a motion image file when INDEX is displayed. To achieve this object, an image playback apparatus includes a playback device adapted to play back from a recording medium a plurality of image files each having motion image data, a display device having a function of displaying on the same screen representative images of a plurality of image files recorded on the recording medium by using the image files played back by the playback device, a selecting device adapted to select an arbitrary one of the plurality of representative images displayed on the display device, and a control device adapted to control the playback device and the display device such that the display form of the representative image selected by the selecting device differs from the display form of other representative images.

4 Claims, 9 Drawing Sheets

SELECTED FILE

MAKE FRAME RATE OF SELECTED FILE HIGHER THAN THAT OF OTHER DISPLAYED FILES

PLAYBACK FRAME RATE = T/2 FOR SELECTED FILE
PLAYBACK FRAME RATE = T/12 FOR NONSELECTED FILES
( T : NORMAL PLAYBACK FRAME RATE )

U.S. PATENT DOCUMENTS

| | | |
|---|---|---|
| 5,926,230 A * | 7/1999 | Niijima et al. ................ 725/56 |
| 6,525,801 B1 | 2/2003 | Matsuzawa et al. ........... 352/40 |
| 7,117,519 B1 * | 10/2006 | Anderson et al. ........... 725/105 |

FOREIGN PATENT DOCUMENTS

| | | |
|---|---|---|
| JP | 2001-45428 | 2/2001 |
| JP | 2001-111963 | 4/2001 |
| JP | 2001-238154 | 8/2001 |
| WO | WO 01/37565 | 5/2001 |

* cited by examiner

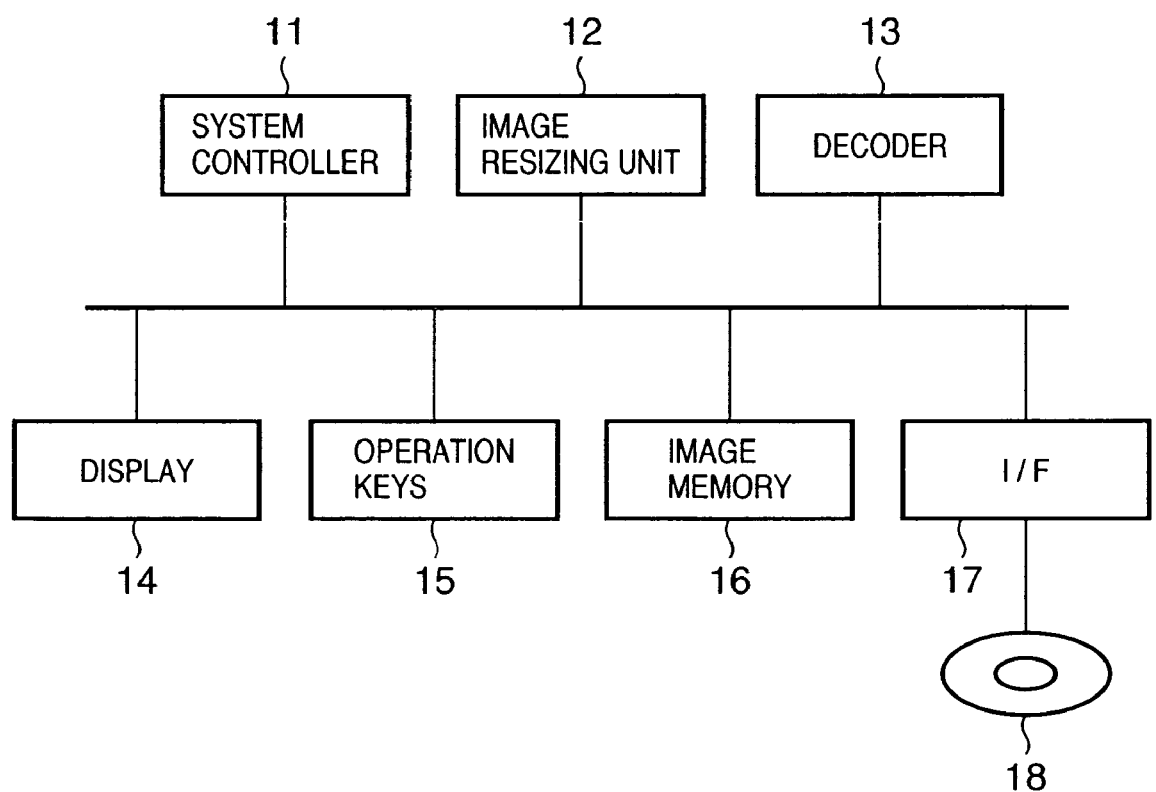

FIG. 2

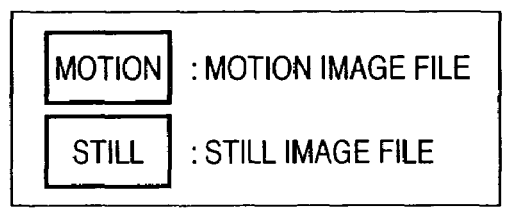

MOTION : MOTION IMAGE FILE
STILL : STILL IMAGE FILE 2-1
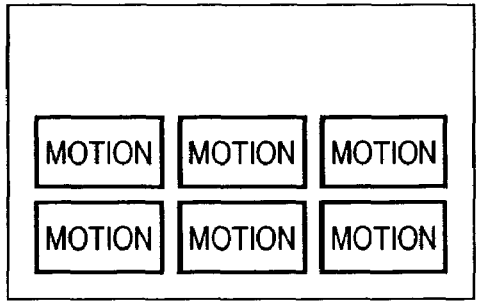

6 IMAGE DISPLAY INDEX
SET FRAME RATE TO 1/6
TO SIMULTANEOUSLY PLAY BACK
6 MOTION IMAGE FILES 2-2
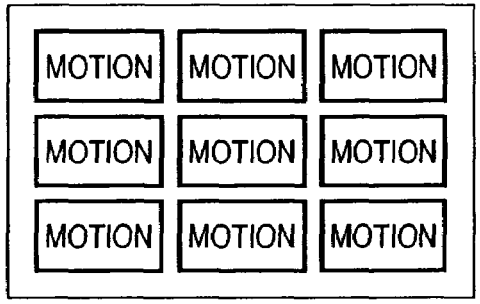

9 IMAGE DISPLAY INDEX
SET FRAME RATE TO 1/9
TO SIMULTANEOUSLY DISPLAY 9
MOTION IMAGE FILES 2-3
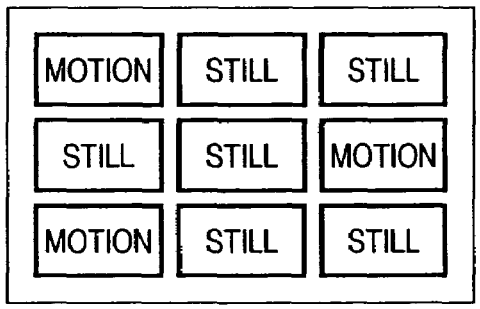

9 IMAGE DISPLAY INDEX
SET FRAME RATE OF 3 MOTION
IMAGE FILES TO 1/3 TO
SIMULTANEOUSLY PLAY BACK 3
MOTION IMAGE FILES,
AND DISPLAY 6 STILL IMAGE FILES
IN REDUCED SCALE

FIG. 4
4-1   NORMAL PLAYBACK
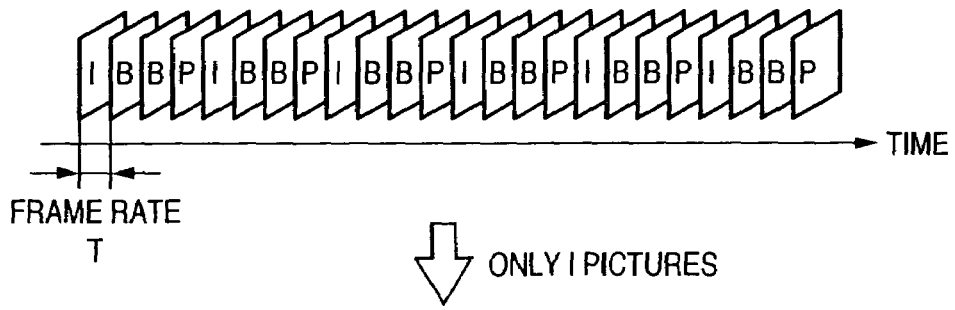
ONLY I PICTURES
4-2
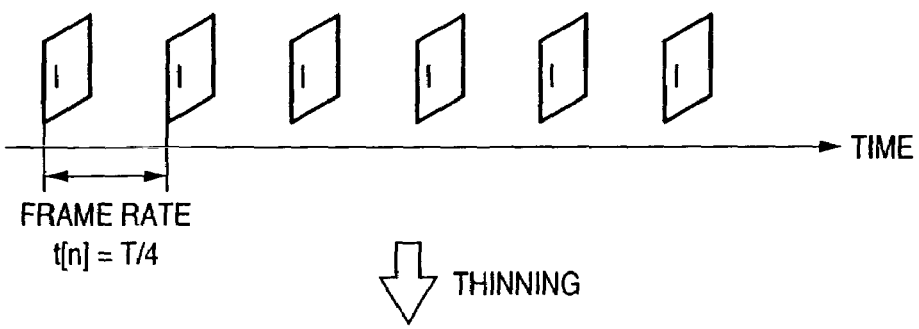
THINNING
4-3
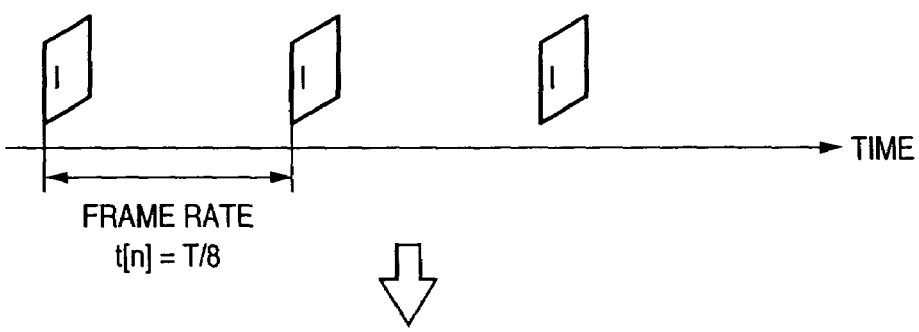
4-4   INDEX MOTION IMAGE PLAYBACK
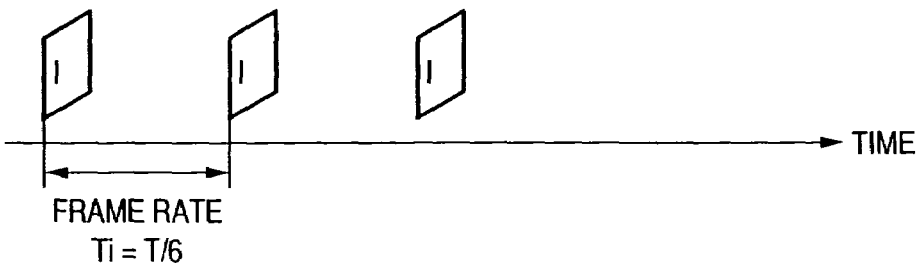

IMAGE PLAYBACK APPARATUS AND METHOD WITH PLAYBACK FRAME RATE OF SELECTED REPRESENTATIVE IMAGE BEING HIGHER THAN THAT OF OTHER REPRESENTATIVE IMAGES, OR WITH PLAYBACK OF AUDIO DATA OF IMAGE FILE CORRESPONDING TO SELECTED REPRESENTATIVE IMAGE

The present application is a continuation of application Ser. No. 10/600,759, filed Jun. 23, 2003.

FIELD OF THE INVENTION

The present invention relates to an image playback apparatus or image recording/playback apparatus capable of random access and having a function of displaying a list in which reduced images of recorded image files are arranged into a predetermined array.

BACKGROUND OF THE INVENTION

Conventionally, apparatuses which record and play back both still image files and motion image files on and from a memory card, disk, and another removable disk are known. Some apparatuses of this type have a function of displaying a list (INDEX) in which reduced images (thumbnails) of individual files are arranged into a predetermined array form.

The contents of an image of a still image file can be recognized at once by a thumbnail. For a motion image, however, only the first frame is usually displayed in a reduced scale as a thumbnail, so the contents of the whole motion image are difficult to recognize. To check the contents of a motion image file, the motion image file must be played back from the beginning. This makes file search time-consuming.

SUMMARY OF THE INVENTION

The present invention, therefore, has been made in consideration of the above situation, and has as its object to allow easy recognition of the contents of a motion image file when INDEX is displayed.

To solve the above problem and achieve the object, according to a first aspect of the present invention, there is provided an image playback apparatus comprising a playback device adapted to play back from a recording medium a plurality of image files each having motion image data, a display device having a function of displaying on the same screen representative images of a plurality of image files recorded on the recording medium by using the image files played back by the playback device, a selecting device adapted to select a desired representative image from the plurality of representative images displayed on the display device, and a control device adapted to control the playback device and the display device such that a display form of the representative image selected by the selecting device differs from a display form of other representative images.

According to a second aspect of the present invention, there is provided an image playback apparatus control method of controlling an image playback apparatus comprising a playback device adapted to play back from a recording medium a plurality of image files each having motion image data, a display device having a function of displaying on the same screen representative images of a plurality of image files recorded on said recording medium by using the image files played back by the playback device, and a selecting device adapted to select a desired representative image from the plurality of representative images displayed on the display device, wherein the playback device and the display device are controlled such that a display form of the representative image selected by the selecting device differs from a display form of other representative images.

According to a third aspect of the present invention, there is provided a program for allowing a computer to execute the image playback apparatus control method described above.

According to a fourth aspect of the present invention, there is provided a storage medium storing the program described above in a computer readable form.

According to a fifth aspect of the present invention, there is provided an image recording/playback apparatus comprising an image sensing device adapted to sense a motion image, a sound input device adapted to input a sound, a recording medium adapted to record a sub sound input from said sound input device in an image sensing standby state for the motion image, a main sound input from the sound input device while the motion image is being sensed, and the motion image sensed by the image sensing device, a display device having a function of displaying, in a predetermined array form, a list of representative images of a predetermined number of image files of a plurality of image files recorded on the recording medium, a selecting device adapted to select at least one of the representative images of the predetermined number of image files displayed on the display device, a sound playback device adapted to playback the sound recorded on the recording medium; and a control device which, when at least one image is selected by the selecting device, controls the sound playback device to play back a sub sound corresponding to the selected image file.

According to a sixth aspect of the present invention, there is provided an image recording/playback apparatus control method of controlling an image recording/playback apparatus comprising an image sensing device adapted to sense a motion image, a sound input device adapted to input a sound, a recording medium adapted to record a sub sound input from the sound input device in an image sensing standby state for the motion image, a main sound input from the sound input device while the motion image is being sensed, and the motion image sensed by the image sensing device, a display device having a function of displaying, in a predetermined array form, a list of representative images of a predetermined number of image files of a plurality of image files recorded on the recording medium, a selecting device adapted to select at least one of the representative images of the predetermined number of image files displayed on the display device, and a sound playback device adapted to play back the sound recorded on the recording medium, wherein when at least one image is selected by the selecting device, the sound playback device is so controlled as to play back a sub sound corresponding to the selected image file.

According to a seventh aspect of the present invention, there is provided a program for allowing a computer to execute the image recording/playback apparatus control method described above.

According to an eighth aspect of the present invention, there is provided a storage medium storing the program described above in a computer readable form.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a schematic block diagram of an image playback apparatus according to the first embodiment of the present invention;

FIG. 2 is a view showing examples of INDEX motion image playback;

FIG. 4 is a view showing the INDEX motion image playback method of the first embodiment;

DETAILED DESCRIPTION OF THE PREFERRED EMBODIMENTS

Preferred embodiments of the present invention will now be described in detail in accordance with the accompanying drawings.

First Embodiment

Figure 3:
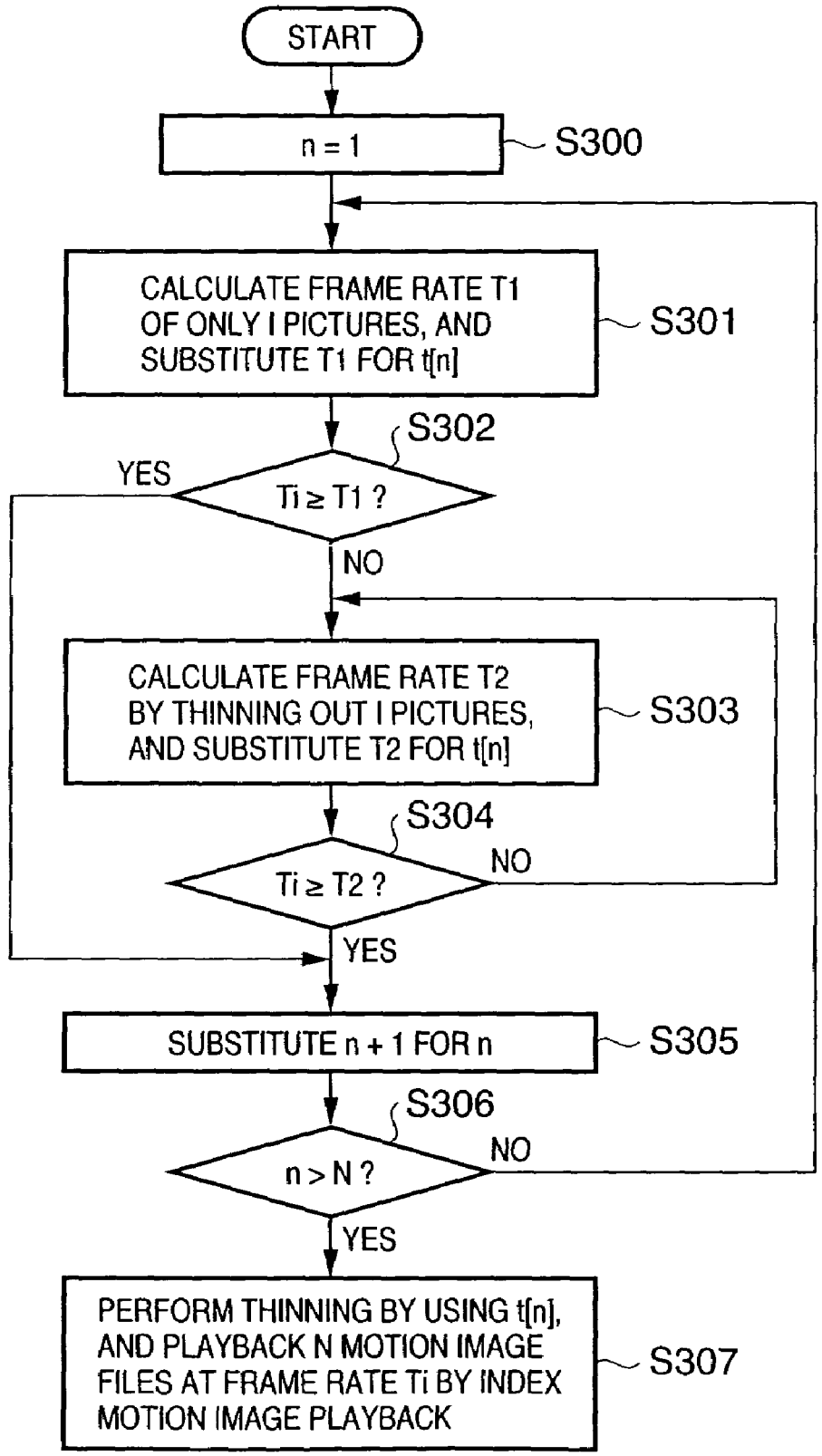
FIG. 3 is a flow chart showing the operation of a system controller for executing an INDEX motion image playback method of the first embodiment.
Figure 5:
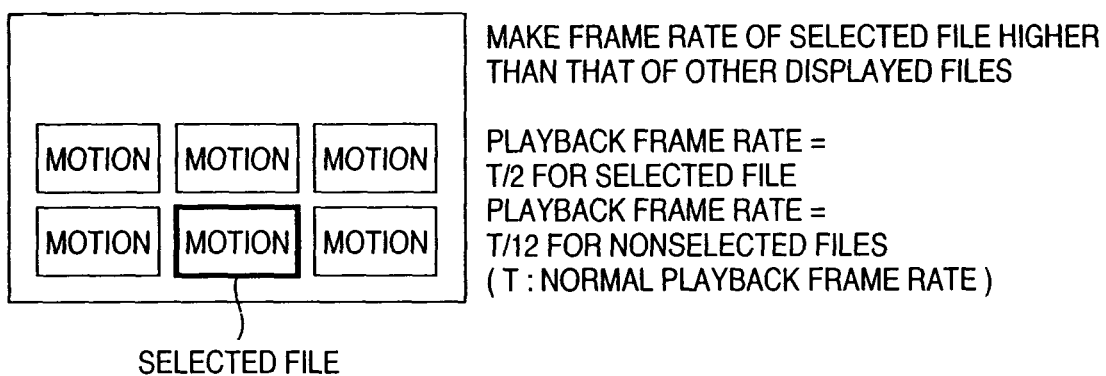
FIG. 5 is a view showing an example in which an image is selected during INDEX motion image playback.
Figure 6:
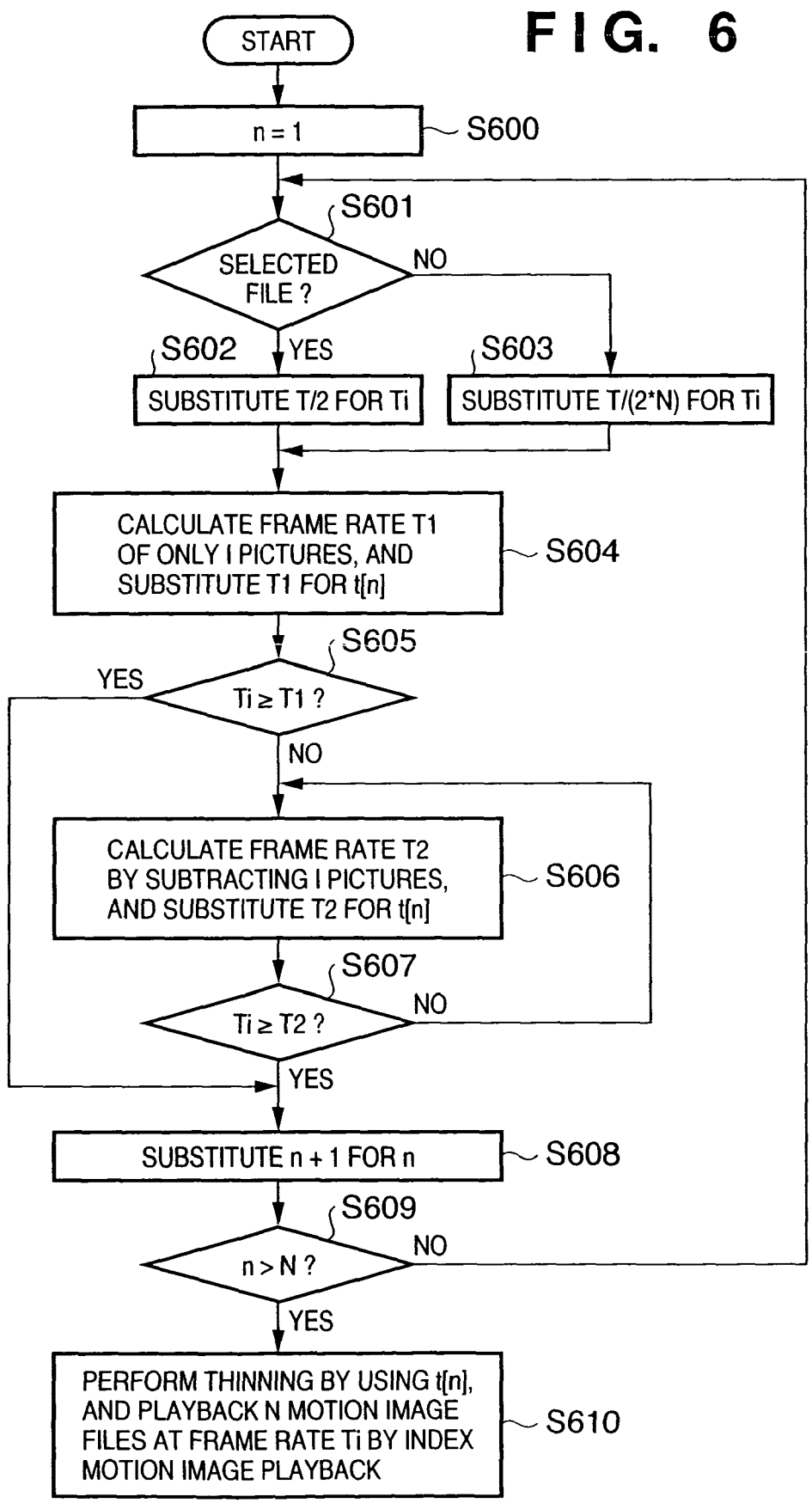
FIG. 6 is a flow chart showing the operation of a system controller when an image is selected during INDEX motion image playback.

FIG. 1 is a schematic block diagram showing an image playback apparatus according to the first embodiment of the present invention. FIG. 2 is a view showing INDEX motion image playback of the first embodiment. FIG. 3 is a flow chart showing the operation of a system controller 11 for executing an INDEX motion image playback method of the first embodiment. FIG. 4 is a view showing the INDEX motion image playback method in FIG. 3. FIG. 5 is a view showing the way an image is selected during INDEX motion image playback of the first embodiment. FIG. 6 is a flow chart showing the operation of the system controller 11 when an image is selected during INDEX motion image playback shown in FIG. 5.

In FIG. 1, reference numeral 11 denotes the system controller for controlling the whole image playback apparatus; 12, a resizing unit for reducing and enlarging an image size; 13, a decoder for expanding compressed image data; 14, a display such as a liquid crystal display for displaying an image; 15, operation keys as an interface with a user; 16, an image memory for recording and holding image data processed by the resizing unit 12 and decoder 13; 17, an interface (I/F) with a recording medium; and 18, a recording medium such as a disk which can be randomly accessed.

In normal playback, the I/F 17 reads out data from the recording medium 18. The decoder 13 decodes and expands the readout data, and rasterizes the expanded data on the image memory 16. The resizing unit 12 reads out the rasterized image data, and displays the readout data on the display 14 after enlarging or reducing the data.

FIG. 2 is a view showing INDEX motion image playback according to the first embodiment of the present invention.

Referring to FIG. 2, 2-1 shows simultaneous playback of six INDEX motion images on the display 14. Letting T be the frame rate (the number of frames to be updated per unit time) when each of the six motion images is normally played back, the frame rate is set to T/6 during INDEX motion image playback. In this manner, thinning playback of the original image of each of the six motion images is performed to simultaneously display six frames of images reduced by the resizing unit 12. Since the frame rate is T/6, the load on the decoder 13 of the image playback apparatus is equal to that of normal playback.

2-2 shows simultaneous playback of nine motion image files on the display 14. Letting T be the frame rate when each of the nine motion images is normally played back, the frame rate is set to T/9 during INDEX motion image playback. In this manner, thinning playback of the original image of each of the nine motion images is performed to simultaneously display nine frames of images reduced by the resizing unit 12. Since the frame rate is T/9, the load on the decoder 13 of the image playback apparatus is equal to that of normal playback, as in the case of 2-1.

2-3 shows playback of nine image files on the display 14. Assume that these nine image files to be displayed include three motion image files and six still image files. Letting T be the frame rate when each of the three motion images is normally played back, the frame rate is set to T/3 during INDEX motion image playback. In this manner, thinning playback of the original image of each of the three motion images is performed to simultaneously display three frames of images reduced by the resizing unit 12. For the still image files, initially displayed images are kept displayed even during INDEX motion image playback. Each still image is decoded only when it is displayed for the first time, and the frame rate of each motion image file is T/3. Therefore, the load on the decoder 13 of the image playback apparatus is equal to that of normal playback.

During INDEX motion image playback as described above, the frame rate is changed in accordance with the number of motion image files to be displayed on the display 14. Consequently, a plurality of motion image files can be played back while the load on the decoder 13 of the image playback apparatus remains the same.

The basic operation of the image playback apparatus will be explained below.

First, when a recorded recording medium is set in the image playback apparatus and playback is started, the operation proceeds to index list display, and index images are displayed on the display 14 as shown in FIG. 2. In this state, a user can move a cursor on the screen to select a given one of the displayed index images. By operating a determination key or the like after thus selecting the image by the cursor, the user can play back only the selected image file.

FIG. 3 is a flow chart showing the operation of the system controller 11 for executing the INDEX motion image playback method of the first embodiment.

Referring to FIG. 3, let T be the frame rate when a motion image file is normally played back, and Ti be the frame rate when INDEX motion image playback is performed. If the number of motion image files to be simultaneously played back on the display 14 is N, Ti=T/N. Let n (N≧n) be the number of a motion image file to be played back by INDEX motion image playback, and t[n] be a thinning frame rate.

First, n is reset to 1 (step S300). The system controller 11 calculates, from the nth motion image file, a frame rate T1 when only I pictures are played back, and substitutes T1 for t[n] (step S301). The system controller 11 then determines whether T1 calculated in step S301 satisfies Ti≧t[n] (step S302). If NO in step S302, the system controller 11 calculates a frame rate T2 (T2=t/2) by further subtracting I pictures from the frame rate t[n] of only the I picture, and substitutes T2 for t[n] (step S303). The system controller 11 determines whether T2 calculated in step S303 satisfies Ti≧t[n] (step S304) If NO in step S304, the flow returns to step S303 to calculate the thinning frame rate T2 again. If YES in step S302 or in step S304, the system controller 11 substitutes n+1 for n (step S305), and determines whether n>N (steps S306). If NO in step S306, the flow returns to step S301. If YES in step S306, the system controller 11 performs image playback by thinning N motion image files by the frame rate t[n] (the frame rate of the first motion image file is T[1]), thereby displaying images reduced by the resizing unit 12 on the display 14 at the frame rate Ti (step S307).

INDEX motion image playback is performed by the above operation.

FIG. 4 is a view showing the INDEX motion image playback method shown in FIG. 3.

Referring to FIG. 4, if the frame rate of normal playback is T and the number N of motion image files to be simultaneously played back is 6, the frame rate of INDEX motion image playback is T/6. n is the number of a file currently being processed, and the thinning playback frame rate t[n] corresponds to n.

4-1 shows a normal playback method in which I, B, and P pictures are played back. When only I pictures are played back from normal playback shown in 4-1, the frame rate is as shown in 4-2. That is, the frame rate t[n] is T/4. Since Ti≧t[n] does not hold, thinning to 1/2 is performed from 4-2. The result is as shown in 4-3. The frame rate t[n] in 4-3 is T/8. Since Ti≧t[n], this motion image file is played back by a thinning playback method using T2. This processing is performed for every N (N=6) files.

When the thinning playback frame rate t[n] for N files is determined, INDEX motion image playback is performed. 4-4 shows this playback. That is, thinning playback is performed using t[n] calculated in 4-3, and images reduced by the resizing unit 12 are displayed at the frame rate Ti.

FIG. 5 is a view showing an example in which an image is selected during INDEX motion image playback of the first embodiment.

When INDEX motion image playback is to be performed, the thinning playback frame rate of a selected file (designated by the cursor) is made higher than those of other nonselected files (not designated by the cursor). For example, if the number of INDEX motion image files to be displayed is 6 as shown in FIG. 5, INDEX motion image playback is performed by setting the thinning playback frame rate of a selected motion image file to T/2, and that of nonselected motion image files to T/(2×6 (the number of images to be displayed))=T/12.

FIG. 6 is a flow chart showing the operation of the system controller 11 when an image is selected during INDEX motion image playback shown in FIG. 5.

Referring to FIG. 6, let T be the frame rate when a motion image file is normally played back, and Ti be the frame rate when INDEX motion image playback is performed. Also, let N be the number of motion image files to be simultaneously played back on the display 14, n (N≧n) be the number of a motion image file to be played back by INDEX motion image playback, and t[n] be the thinning frame rate.

First, n is reset to 1 (step S600). The system controller 11 determines whether the nth file is currently being selected (step S601). If YES in step S601, T/2 is substituted for Ti (step S602). If NO in step S601, T/(2×N) is substituted for Ti (step S602). The system controller 11 calculates, from the nth motion image file, a frame rate T1 when only I pictures are played back, and substitutes T1 for t[n] (step S604). The system controller 11 determines whether T1 calculated in step S604 satisfies Ti≧t[n] (step S605). If NO in step S605, the system controller 11 calculates a frame rate T2 (T2=t/2) by further subtracting I pictures from the frame rate t[n] of only the I pictures, and substitutes T2 for t[n] (step S606). The system controller 11 then determines whether the frame rate T2 calculated in step S605 satisfies Ti≧t[n] (step S607). If NO in step S607, the flow returns to step S606 to calculate the thinning frame rate T2 again. If YES in step S605 or in step S607, the system controller substitutes n+1 for n (step S608), and determines whether n>N (step S609). If NO in step S609, the flow returns to step S601. If YES in step S609, the system controller 11 performs image playback by thinning N motion image files by the frame rate t[n] (the frame rate of the first motion image file is T[1]). That is, the system controller 11 displays images reduced by the resizing unit 12 on the display 14 such that the frame rate of a selected file is T/2 and the frame rate of nonselected files is T/(2×N) (step S610).

By the above operation, the playback frame rate of a file selected in INDEX motion image playback is increased.

Second Embodiment

In the above first embodiment, the INDEX motion image playback frame rate is determined in accordance with the number of motion image files to be displayed on the screen. However, if still images and motion images are mixed, the INDEX motion image playback frame rate can also be determined in accordance with the number of image files (of both still images and motion images) to be displayed.

Third Embodiment

In the above first embodiment, a selected motion image file is played back by increasing the frame rate, and nonselected motion image files are played back by decreasing the frame rate. However, it is also possible to display a motion image of only a selected motion image file, and display only a representative image, in the form of a still image, for each nonselected motion image file.

As described above, the first to third embodiments can implement INDEX motion image playback by which a plurality of thinned motion image files can be simultaneously played back and displayed by using the calculated frame rate. Therefore, a user can recognize the contents of a plurality of motion image files at the same time. Also, the frame rate of a selected motion image file can be made higher than that of nonselected motion image files. This allows a user to recognize details of the contents of an image recorded in the selected file.

Fourth Embodiment

The fourth embodiment can perform image INDEX display as in the first embodiment and can also output sounds at the same time. Additionally, the fourth embodiment has not only a function of playing back images and sounds but also a function of recording them. In this embodiment, all images to be played back by INDEX display can be still images.

Figure 7:
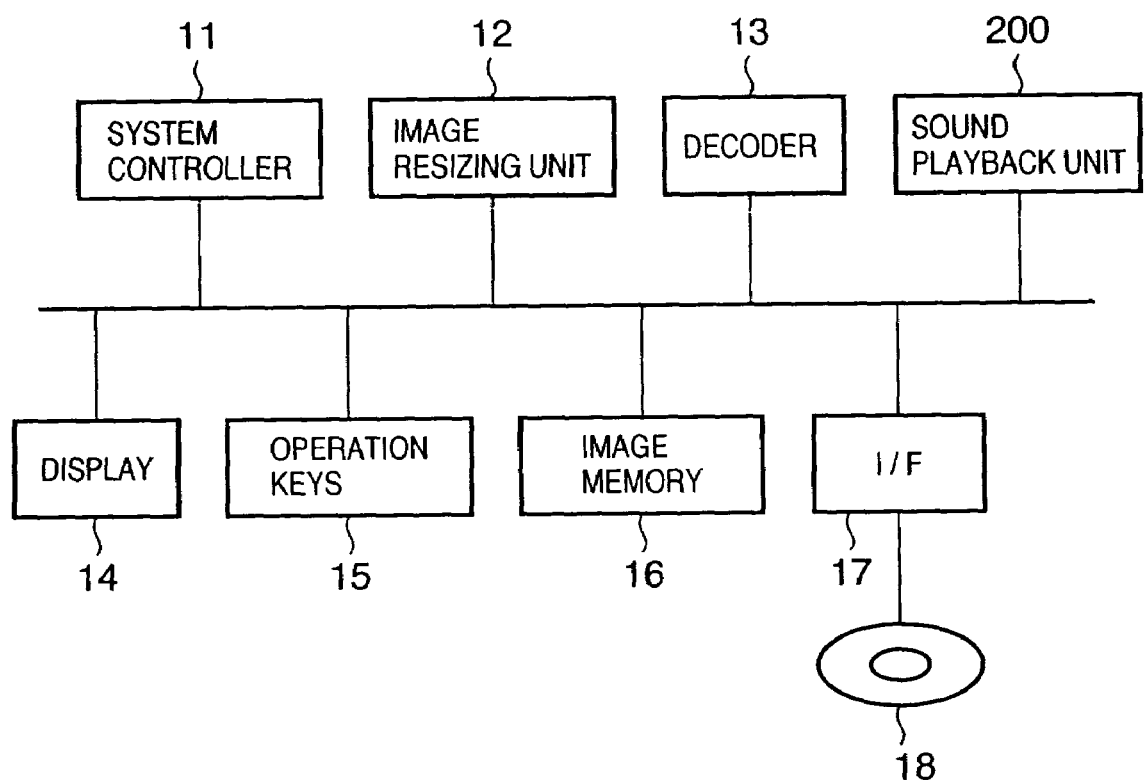
FIG. 7 is a block diagram showing the arrangement of a playback portion of the fourth embodiment.

FIG. 7 is a block diagram showing the arrangement of a playback portion of the fourth embodiment, in which a sound playback unit 200 is added to the arrangement of the first embodiment shown in FIG. 1.

Figure 8:
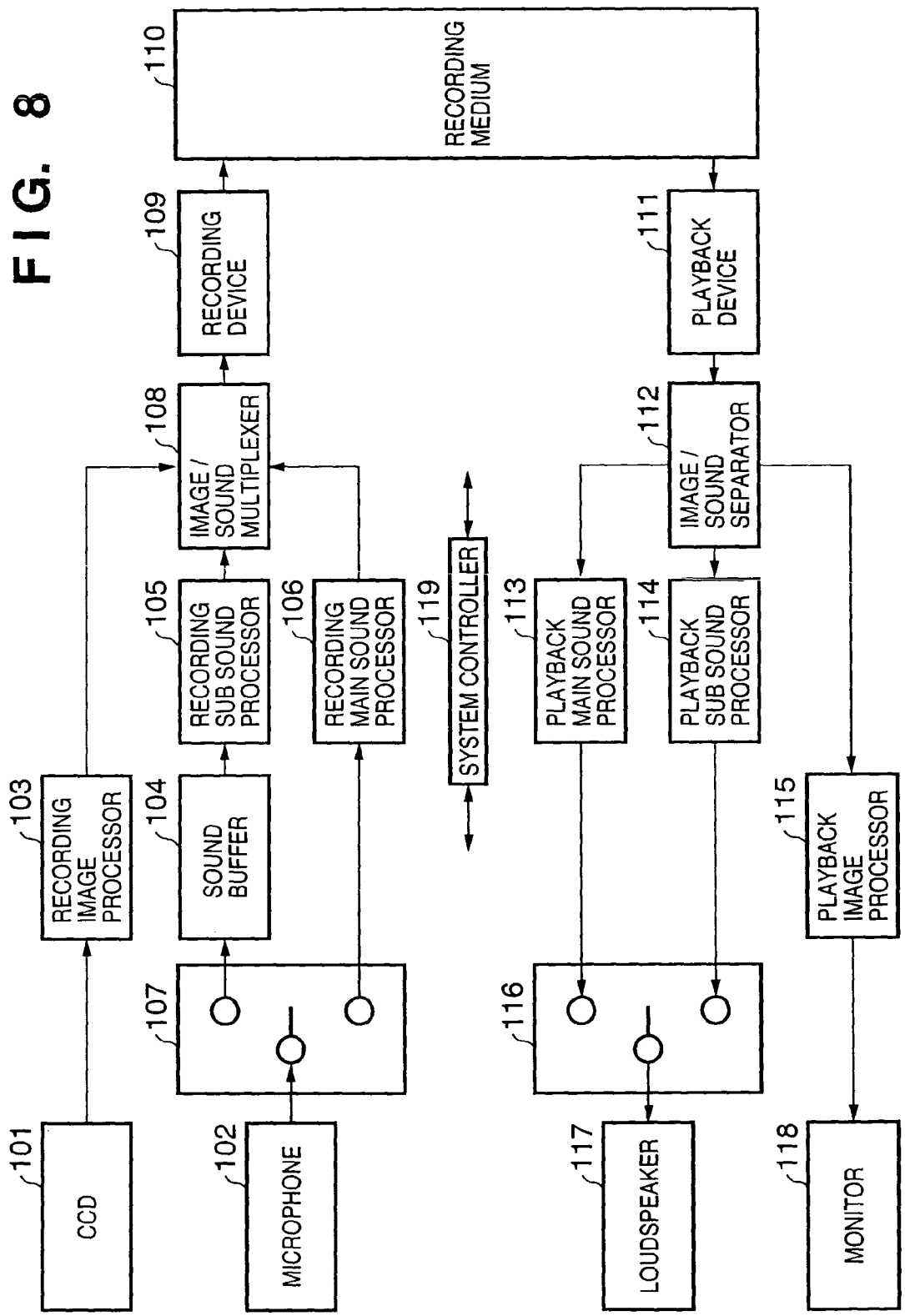
FIG. 8 is a block diagram of a motion image/sound recording/playback apparatus according to the fourth embodiment.

FIG. 8 is a block diagram of a motion image/sound recording/playback apparatus according to the fourth embodiment of the present invention. The playback portion shown in FIG. 7 is illustrated in more detail in FIG. 8.

In FIG. 8, reference numeral 101 denotes an image sensing device for converting an image into an electrical signal; 102, a microphone for converting a sound into an electrical signal; 103, a recording image processor for converting an output image signal from the image sensing device 101 into a predetermined format to record the signal; 104, a sound buffer for temporarily storing a sound signal of a predetermined time; 105, a recoding sub sound processor for converting a sub sound signal into a predetermined format to record the signal; 106, a recording main sound processor for converting a main sound signal into a predetermined format to record the signal; 107, a switch for selectively outputting the output sound signal from the microphone 102 to the sound buffer 104 and recording main sound processor 106; 108, an image/sound multiplexer for multiplexing the output recording image signal from the recording image processor 103, the output sub sound signal from the recording sub sound processor 105, and the output main sound signal from the recording main sound processor 106; 109, a recording device for recording the output recording signal from the image/sound multiplexer 108 on a recording medium 110; 111, a playback device for playing back the output playback signal from the recording medium 110; 112, an image/sound separator for separating the output playback signal from the playback device 111 into an image signal, main sound signal, and sub sound signal; 113, a playback main sound processor for processing the output main sound signal from the image/sound separator 112; 114, a playback sub sound processor for processing the output sub sound signal from the image/sound separator 112; 115, a playback image signal processor for processing the output image signal from the image/sound separator 112; 116, a switch for selectively outputting the output main sound signal from the playback main sound processor 113 and the output sub sound signal from the playback sub sound processor 114; 117, a loudspeaker for outputting the output sound signal from the switch 116; 118, a monitor for outputting the output image signal from the playback image signal processor 115; and 119, a system controller for controlling the individual functional circuits.

The operation of the fourth embodiment will be explained below.

(Recording)

When the motion image/sound recording/playback apparatus is set in a recording mode by an operation by the user, a recording standby state starts, and the system controller 119 so switches the switch 107 as to output an output sound signal from the microphone 102 to the sound buffer 104. The sound buffer 104 is always updated by a new sound signal to store the latest sound signal of a predetermined time. Before starting recording, the user stores in the sound buffer 104 a sound such as an explanation of an image to be sensed.

When recording is started by an operation by the user, the system controller 119 so switches the switch 107 as to output an output sound signal from the microphone 102 to the recording main sound processor 106. At the same time, the system controller 119 stops updating of the sound signal in the sound buffer 104. The sound signal stored in the sound buffer 104 is converted into a predetermined format and output as a sub sound signal to the image/sound multiplexer 108 by the recording sub sound processor 105. Also, the output sound signal from the microphone 102 is converted into a predetermined format and output as a main sound signal to the image/sound multiplexer 108 by the recording main signal processor 106. An output image signal from the image sensing device 101 is converted into a predetermined format and output as an image signal to the image/sound multiplexer 108 by the recording image processor 103. The image/sound multiplexer 108 multiplexes the image signal, main sound signal, and sub sound signal, and outputs the multiplexed signal to the recording device 109. The recording device 109 records the multiplexed signal on the recording medium 110.

When the predetermined-time signal stored in the sound buffer 104 is completely recorded, recording of the sub sound signal is stopped, and the image signal and main sound signal are recorded on the recording medium 110.

(Playback)

Figure 9:
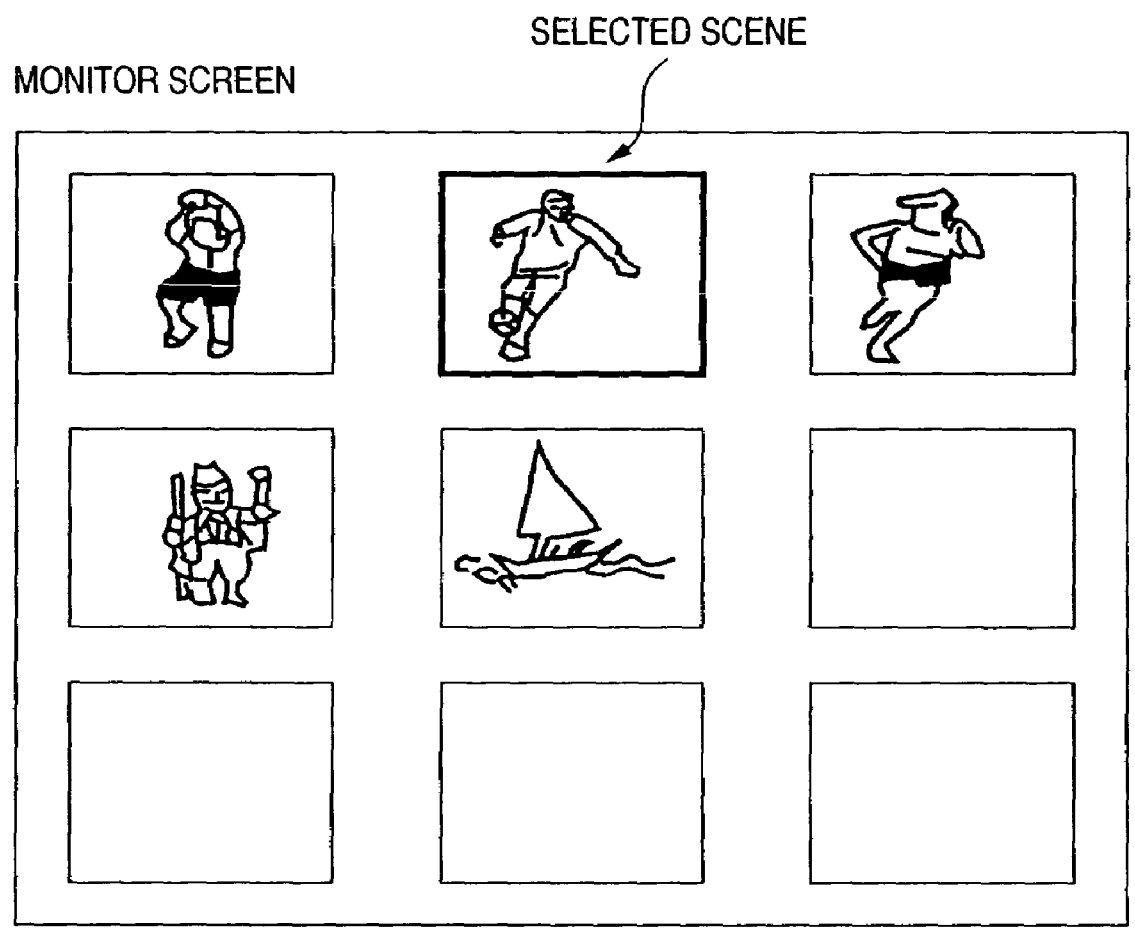
FIG. 9 is a view showing an example of display of a list containing a plurality of scenes.

When the motion image/sound recording/playback apparatus is set in a playback mode by an operation by the user, the playback device 111 plays back the first frame signal of a plurality of scenes recorded on the recording medium 110, and outputs the signal to the image/sound separator 112. The image/sound separator 112 separates the output playback signal from the playback device 111 into an image signal, main sound signal, and sub sound signal. The playback image processor 115 processes the output image signal from the image/sound separator 112, generates image data indicating an INDEX image as described previously, and outputs the generated image data to the monitor 118. For example, a scene selecting list as shown in FIG. 9 is displayed.

When one of a plurality of scenes in the displayed list is selected by an operation by the user, the playback device 111 plays back a signal of the selected scene, and the playback sub sound processor 114 processes the output sub sound signal from the image/sound separator 112 to convert the signal into a playable sound signal. The system controller 119 so switches the switch 116 as to output the output signal from the playback sub sound processor 114 to the loudspeaker 117. The loudspeaker 117 outputs the output playable sound signal from the playback sub sound processor 114.

If no sub sound signal is recorded in the scene selected by the user, the image/sound separator 112 detects that no sub sound signal is recorded, and notifies the system controller 119 of this information. When receiving this notification indicating that no sub sound signal is recorded in the selected scene, the system controller 119 so switches the switch 116 as to output the output signal from the playback main sound processor 113 to the loudspeaker 117. The playback main sound processor 113 processes the output main sound signal from the image/sound separator 112 to convert the signal into a playable sound signal. Since the switch 116 is so switched as to output the output signal from the playback main sound processor 113 to the loudspeaker 117, the main sound signal of the selected scene is output from the loudspeaker 117. In addition, if no sub sound signal is recorded in the scene selected by the user, a message is displayed to prompt the user to record a sub sound signal to be output when the scene is selected from the displayed list.

As described above, the fourth embodiment can provide a motion image/sound recording/playback apparatus by which a user can easily select a desired scene from a recording medium recording a plurality of scenes without any complicated operation.

Other Embodiments

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a storage medium (or a recording medium) recording program codes of software for implementing the functions of the above embodiments to a system or apparatus, and reading out and executing the program codes stored in the storage medium by a computer (or a CPU or MPU) of the system or apparatus. In this case, the program codes read out from the storage medium implement the functions of the embodiments, and the storage medium storing these program codes constitutes the invention. Also, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention includes a case where the program codes read out from the storage medium are written in a memory of a function expansion card inserted into the computer or of a function expansion unit connected to the computer, and, in accordance with designations by the program codes, a CPU or the like of the function expansion card or function expansion unit performs part or the whole of actual processing and thereby implements the functions of the above embodiments.

When the present invention is applied to the storage medium described above, this storage medium stores program codes corresponding the flow charts explained previously.

As has been described above, each embodiment allows a user to readily recognize the contents of a motion image file when INDEX is displayed.

The present invention is not limited to the above embodiments and various changes and modifications can be made within the spirit and scope of the present invention. Therefore, to apprise the public of the scope of the present invention, the following claims are made.

What is claimed is:

1. An image playback apparatus comprising:
   a playback device adapted to play back from a recording medium a plurality of image files each having motion image data;
   a display device having a function of displaying on the same screen representative images of the plurality of image files as motion images by using the image files played back by said playback device;
   a selecting device adapted to select a desired representative image from the plurality of representative images displayed by said display device, said display device displaying the selected representative image and the other representative images on the same screen; and
   a control device adapted to control said playback device and said display device such that a playback frame rate of the selected representative image is higher than the playback frame rate of the other representative images displayed on the same screen.

2. An apparatus according to claim 1, wherein said control device determines a playback frame rate of the plurality of representative images in accordance with the number of the representative images to be displayed on the same display screen.

3. An image playback apparatus control method of controlling an image playback apparatus comprising a playback device adapted to play back from a recording medium a plurality of image files each having motion image data, a display device having a function of displaying on the same screen representative images of the plurality of image files as motion images by using the image files played back by said playback device, and a selecting device adapted to select a desired representative image from the plurality of representative images displayed on said display device, said display device displaying the selected representative image and the other representative images on the same screen,
   wherein said playback device and said display device are controlled such that a playback frame rate of the selected representative image is higher than the playback frame rate of the other representative images displayed on the same screen.

4. An image playback apparatus comprising:
   a playback device adapted to play back from a recording medium a plurality of image files each having motion image data;
   mode setting means adapted to set one of a normal reproduction mode and an index reproduction mode;
   a display device having a function of displaying on the same screen a plurality of representative images of the plurality of image files as motion images by using the image files played back by said playback device in the index reproduction mode;
   a selecting device adapted to select a desired representative image from the plurality of representative images displayed by said display device, said display device displaying the selected representative image and the other representative images on the same screen; and
   a control device adapted to control said playback device and said display device,
   said control device controlling, in the normal reproduction mode, said playback device and said display device such that said playback device plays back one of the plurality of image files from the recording medium and said display device displays motion images corresponding to the motion image data of the reproduced image file, and
   said control device controlling, in the index reproduction mode, said playback device and said display device such that a playback frame rate of each of the plurality of representative images displayed by said display device is lower than the playback frame rate of the motion images in the normal reproduction mode and such that the playback frame rate of the selected representative image is higher than the playback frame rate of the other representative images displayed on the same screen.

* * * * *

UNITED STATES PATENT AND TRADEMARK OFFICE
CERTIFICATE OF CORRECTION

PATENT NO. : 7,430,363 B2
APPLICATION NO. : 10/653956
DATED : September 30, 2008
INVENTOR(S) : Kouji Kogusuri et al.

It is certified that error appears in the above-identified patent and that said Letters Patent is hereby corrected as shown below:

COLUMN 5:
Line 8, "S304)" should read --S304).--.
Line 11, "steps" should read --step--.

COLUMN 6:
Line 2, "S602" should read --S603--.

COLUMN 9:
Line 13, "are" should read --being--.

Signed and Sealed this

Twenty-fourth Day of November, 2009

David J. Kappos
*Director of the United States Patent and Trademark Office*